(No Model.)
J. F. & M. C. McMILLAN.
SHOCK COMPRESSOR.
No. 422,963. Patented Mar. 11, 1890.
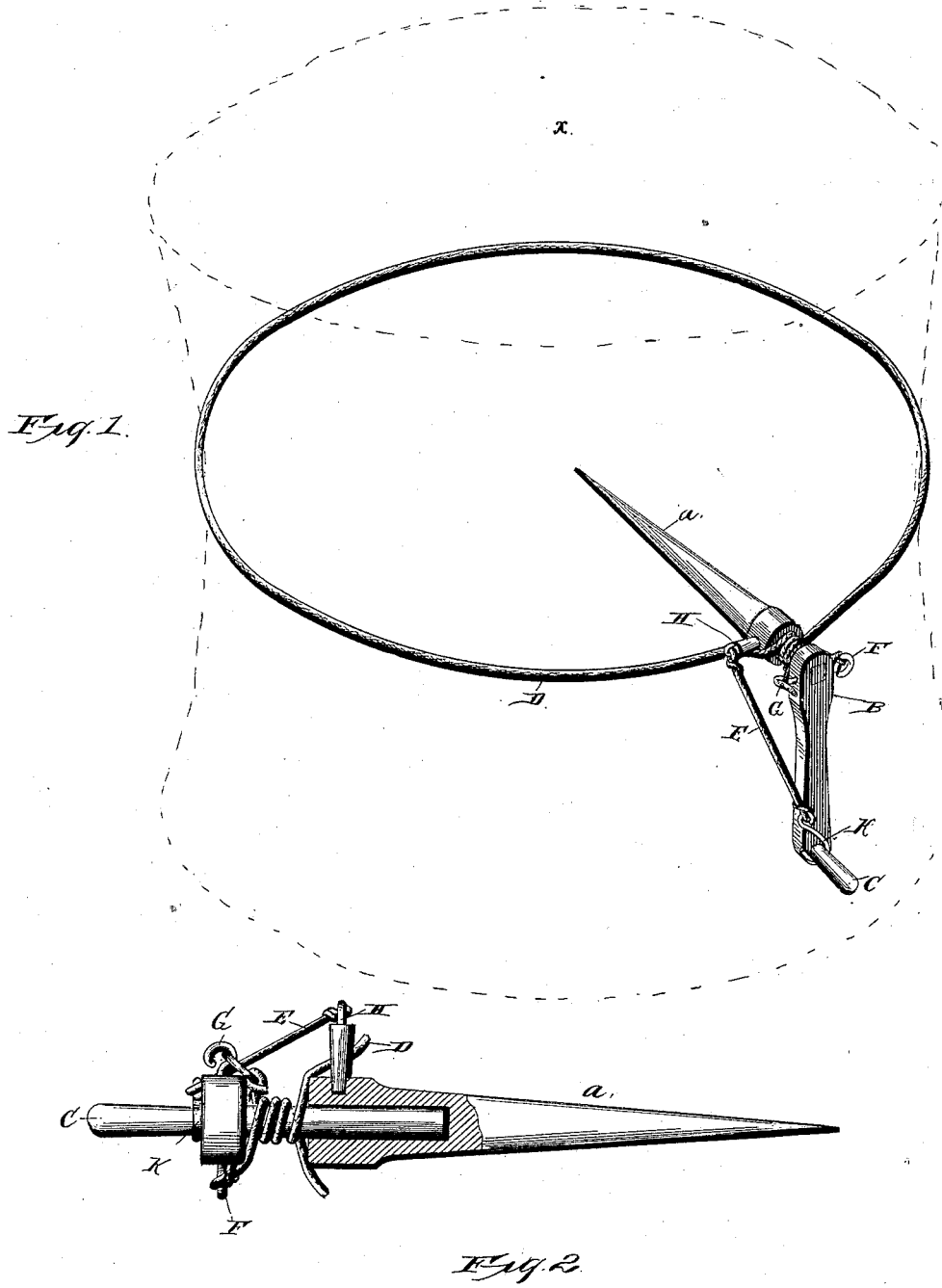

UNITED STATES PATENT OFFICE.

JOSHUA F. McMILLAN AND MOSES C. McMILLAN, OF WILMINGTON, OHIO.

SHOCK-COMPRESSOR.

SPECIFICATION forming part of Letters Patent No. 422,963, dated March 11, 1890.

Application filed July 2, 1889. Serial No. 316,284. (No model.)

*To all whom it may concern:*

Be it known that we, JOSHUA F. MCMILLAN and MOSES C. MCMILLAN, citizens of the United States, residing at Wilmington, in the county of Clinton and State of Ohio, have invented certain new and useful Improvements in Shock-Compressors; and we do hereby declare the following to be a full, clear, and exact description of the invention, such as will enable others skilled in the art to which it appertains to make and use the same.

Our invention consists in the within-described shock-compressor, to be used in the field for compressing the shock while a permanent grain-band is being fastened about it.

In the drawings, Figure 1 represents the shock-compressor in position, the sheaf being indicated by dotted lines. Fig. 2 is a plan view and partial section of Fig. 1.

Our shock-compressor consists of the main pin $a$, which is inserted in the sheaf $x$, which is shown in dotted lines in Fig. 1. Mounted in or upon the main pin $a$ is the crank B, which is revolved by means of the handle C. The compressing-band D is permanently attached at one extremity to the crank B by the staple F or any equivalent or suitable construction. The other end of the compressing-band D is detachably connected to the crank B by the hook G or equivalent device.

On any suitable projection H from the main pin $a$ a flexible stop, preferably composed of a cord E and a hook K, extends, so as to cross the compressing-band D and to engage with the end of the crank B when desirable. The projection H may be made rigid with the pin $a$; but we find it advantageous to make it detachable therefrom, and have so shown it in our preferred construction, in which H is a small pin fitting into a socket in the main pin $a$.

The operation of our invention is the following: The end of the compressing-band D being detached from the hook G, the main pin $a$ is driven into the shock at the point where it is desired to compress it. The compressing-band E is passed around the shock and hooked by means of the hook G, as shown in the drawings. The crank B is then turned by means of the handle C, and the ends of the compressing-band D are thereby wound up and the shock compressed. When the shock has been sufficiently compressed, the hook K is passed over the handle C, and the apparatus is thereby locked and the shock held in a state of compression until the permanent band of straw, cord, or wire has been passed around it and fastened.

Some of the advantages of our invention are these:

The main pin $a$ is comparatively small and can easily be inserted in the shock. At the same time any possibility of the main pin turning, and thereby releasing the shock from compression after the apparatus has been locked, is prevented by the fact that our flexible stop for the crank crosses the compressing-band D, and therefore the aforesaid tendency to turning of the main pin $a$ is opposed and prevented.

Another advantage is that when the flexible stop is made detachable from the main pin it is not in the way while the rest of the apparatus is being applied to the shock and the compression produced by turning the crank B. When a sufficient degree of compression has been produced, however, the stop can be quickly inserted in its place and the apparatus locked in position.

Having therefore described our invention, what we claim as new, and desire to protect by Letters Patent, is—

1. In a shock-compressor, the combination of the main pin, a crank mounted and turning upon or in said pin, together with the flexible stop for said crank, which is detachably connected to the pin and to the crank, substantially as described.

2. In a shock-compressor, the combination of the main pin, a crank mounted and turning in or upon said pin, a compressing-band which has one end permanently connected and the other detachably connected to the crank, together with the flexible stop which is detachably connected to the main pin and to the crank, substantially as described.

3. In a shock-compressor, the combination of the main pin, a crank mounted and turning upon or in said pin, the compressing-band which has one end permanently connected to the crank and its other end detachably connected thereto, together with the flexible stop for said crank, which is attached to the main pin, and which, when in operative position, crosses the compressing-band, substantially as described.

4. In a shock-compressor, the combination of the main pin, a crank mounted and turning in or upon said pin, a compressing-band which has one end permanently and the other detachably connected to the crank, together with the flexible stop which is detachably connected to the main pin and to the crank, and which, when in operative position, crosses the compressing-band, substantially as described.

In testimony whereof we affix our signatures in presence of two witnesses.

JOSHUA F. McMILLAN.
MOSES C. McMILLAN.

Witnesses:
LEVI MILLS,
E. GREENE.